United States Patent
Ho et al.

(10) Patent No.: US 8,160,137 B2
(45) Date of Patent: Apr. 17, 2012

(54) IMAGE DATA COMPRESSION APPARATUS FOR REFERRING TO AT LEAST ONE CHARACTERISTIC VALUE THRESHOLD TO SELECT TARGET COMPRESSION RESULT FROM CANDIDATE COMPRESSION RESULTS OF ONE BLOCK AND RELATED METHOD THEREOF

(75) Inventors: Hung-Hui Ho, Hsinchu County (TW); Chiuan-Shian Chen, Tainan (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 253 days.

(21) Appl. No.: 12/716,283

(22) Filed: Mar. 3, 2010

(65) Prior Publication Data

US 2011/0216982 A1 Sep. 8, 2011

(51) Int. Cl.
*H04N 7/12* (2006.01)
(52) U.S. Cl. .................... 375/240.02; 382/239
(58) Field of Classification Search ............ 375/240.02
See application file for complete search history.

(56) References Cited

U.S. PATENT DOCUMENTS

| | | | | |
|---|---|---|---|---|
| 4,691,329 A * | 9/1987 | Juri et al. ............... 375/240 |
| 5,432,555 A * | 7/1995 | Park ..................... 375/240.02 |
| 5,517,246 A * | 5/1996 | Suzuki .................. 348/412.1 |
| 5,644,305 A * | 7/1997 | Inoue et al. ............... 341/67 |
| 5,708,511 A * | 1/1998 | Gandhi et al. ............ 382/239 |
| 5,798,751 A * | 8/1998 | Kanda .................... 345/673 |
| 5,831,872 A * | 11/1998 | Pan et al. ............... 348/384.1 |
| 6,208,273 B1 * | 3/2001 | Dye et al. ................. 341/51 |
| 6,721,359 B1 * | 4/2004 | Bist et al. .............. 375/240.03 |
| 6,725,225 B1 * | 4/2004 | Kori ..................... 707/693 |
| 6,895,051 B2 * | 5/2005 | Nieweglowski et al. 375/240.03 |
| 2001/0038642 A1 * | 11/2001 | Alvarez et al. ............ 370/477 |
| 2008/0170626 A1 * | 7/2008 | Sung et al. ............. 375/240.24 |
| 2008/0247641 A1 * | 10/2008 | Rasmusson et al. ....... 382/166 |
| 2010/0208794 A1 * | 8/2010 | Ohgose et al. ........... 375/240.02 |
| 2011/0007182 A1 * | 1/2011 | Yamada ................. 348/224.1 |
| 2011/0216982 A1 * | 9/2011 | Ho et al. ................ 382/238 |

* cited by examiner

*Primary Examiner* — Sath V Perungavoor
(74) *Attorney, Agent, or Firm* — Winston Hsu; Scott Margo

(57) ABSTRACT

An exemplary image data compression apparatus includes a compression circuit, a characteristic value extracting circuit, and a selecting circuit. The compression circuit is utilized for applying a plurality of different compression approaches to a first block, and accordingly generating a plurality of first candidate compression results of the first block. The characteristic value extracting circuit is coupled to the compression circuit, and utilized for deriving a plurality of first characteristic values from the first candidate compression results, respectively. The selecting circuit is coupled to the compression circuit and the characteristic value extracting circuit, and utilized for selecting a target compression result of the first block from the first candidate compression results according to the first characteristic values and at least one characteristic value threshold.

26 Claims, 7 Drawing Sheets

IMAGE DATA COMPRESSION APPARATUS FOR REFERRING TO AT LEAST ONE CHARACTERISTIC VALUE THRESHOLD TO SELECT TARGET COMPRESSION RESULT FROM CANDIDATE COMPRESSION RESULTS OF ONE BLOCK AND RELATED METHOD THEREOF

BACKGROUND

The disclosed embodiments of the present invention relate to processing an image data, and more particularly, to an image data compression apparatus for referring to at least one characteristic value threshold to select a target compression result from candidate compression results of one block and related method thereof.

Data compression is commonly used to reduce the amount of data stored in a storage device. Regarding an overdrive technique applied to a liquid crystal display (LCD) panel for example, it artificially boosts the response time by increasing the driving voltage used to make a liquid crystal cell change its state. The overdrive voltage of one liquid crystal cell (i.e., one pixel) is determined by a pixel value in a current frame and a pixel value in a previous frame. Therefore, an image data of the previous frame has to be recorded into a frame buffer for later use. In general, the image data of the previous frame will be compressed before stored into the frame buffer. If a compression approach which provides a lower compression ratio is employed to compress the image data of the previous frame, the frame buffer is required to have a greater storage capacity; otherwise, the frame buffer cannot accommodate all of the compressed image data of the previous frame. However, if a higher compression ratio is employed, a difference between an original image data and a recovered image data derived from the compressed image data will become more significant, leading to degradation of the display quality.

In view of above, there is a need for an image data compression method and apparatus which can adopt an adequate compression approach to compress the image data of each frame.

SUMMARY

In accordance with exemplary embodiments of the present invention, an image data compression apparatus for referring to at least one characteristic value threshold to select a target compression result from candidate compression results of one block and related method thereof are proposed to solve the above-mentioned problem.

According to one aspect of the present invention, an exemplary image data compression apparatus is disclosed. The exemplary image data compression apparatus includes a compression circuit, a characteristic value extracting circuit, and a selecting circuit. The compression circuit is utilized for applying a plurality of different compression approaches to a first block, and accordingly generating a plurality of first candidate compression results of the first block. The characteristic value extracting circuit is coupled to the compression circuit, and utilized for deriving a plurality of first characteristic values from the first candidate compression results, respectively. The selecting circuit is coupled to the compression circuit and the characteristic value extracting circuit, and utilized for selecting a target compression result of the first block from the first candidate compression results according to the first characteristic values and at least one characteristic value threshold.

According to another aspect of the present invention, an exemplary image data compression method is disclosed. The exemplary image data compression method includes: applying a plurality of different compression approaches to a first block, and accordingly generating a plurality of first candidate compression results of the first block; deriving a plurality of first characteristic values from the first candidate compression results, respectively; and utilizing a selecting circuit to select a target compression result of the first block from the first candidate compression results according to the first characteristic values and at least one characteristic value threshold.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The conception of the present invention is to refer to at least one characteristic value threshold to determine which one of candidate compression results of a block within a frame should be selected as a target compression result of the block. For example, the characteristic value threshold is an error threshold which is properly set by considering the compressed data size. In this way, even though the image data compression produces an output with a variable bit rate, it is guaranteed that the frame buffer is capable of storing all compressed image data of a frame. Besides, in a case where the display quality is also considered, a compression result satisfying the requirement set by the error threshold and having a minimum error (i.e., a longest code length) is preferably selected as the target compression result. Further details will be described as follows.

Figure 1:
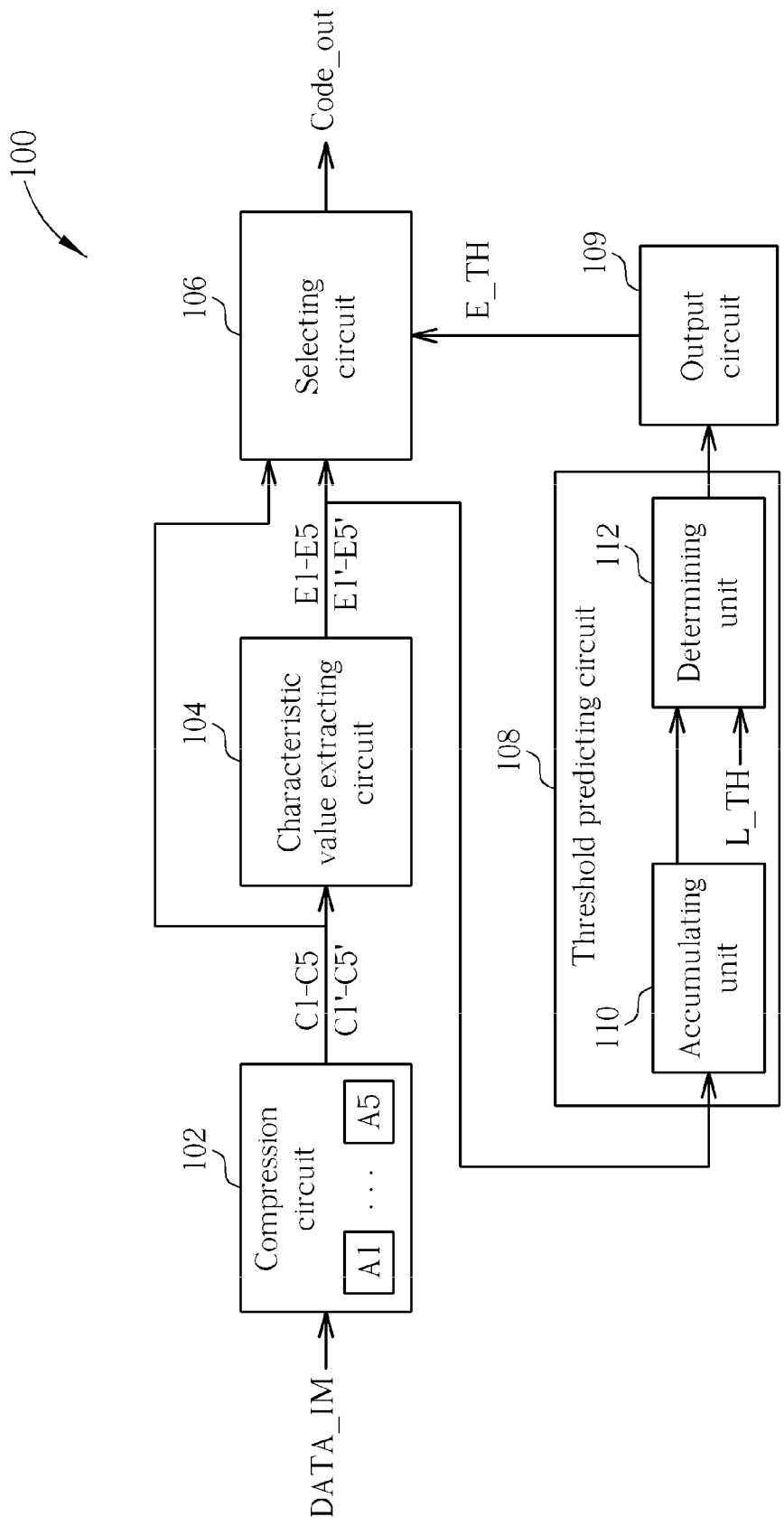
FIG. 1 is a block diagram of an image data compression apparatus according to a first exemplary embodiment of the present invention.
Figure 2:
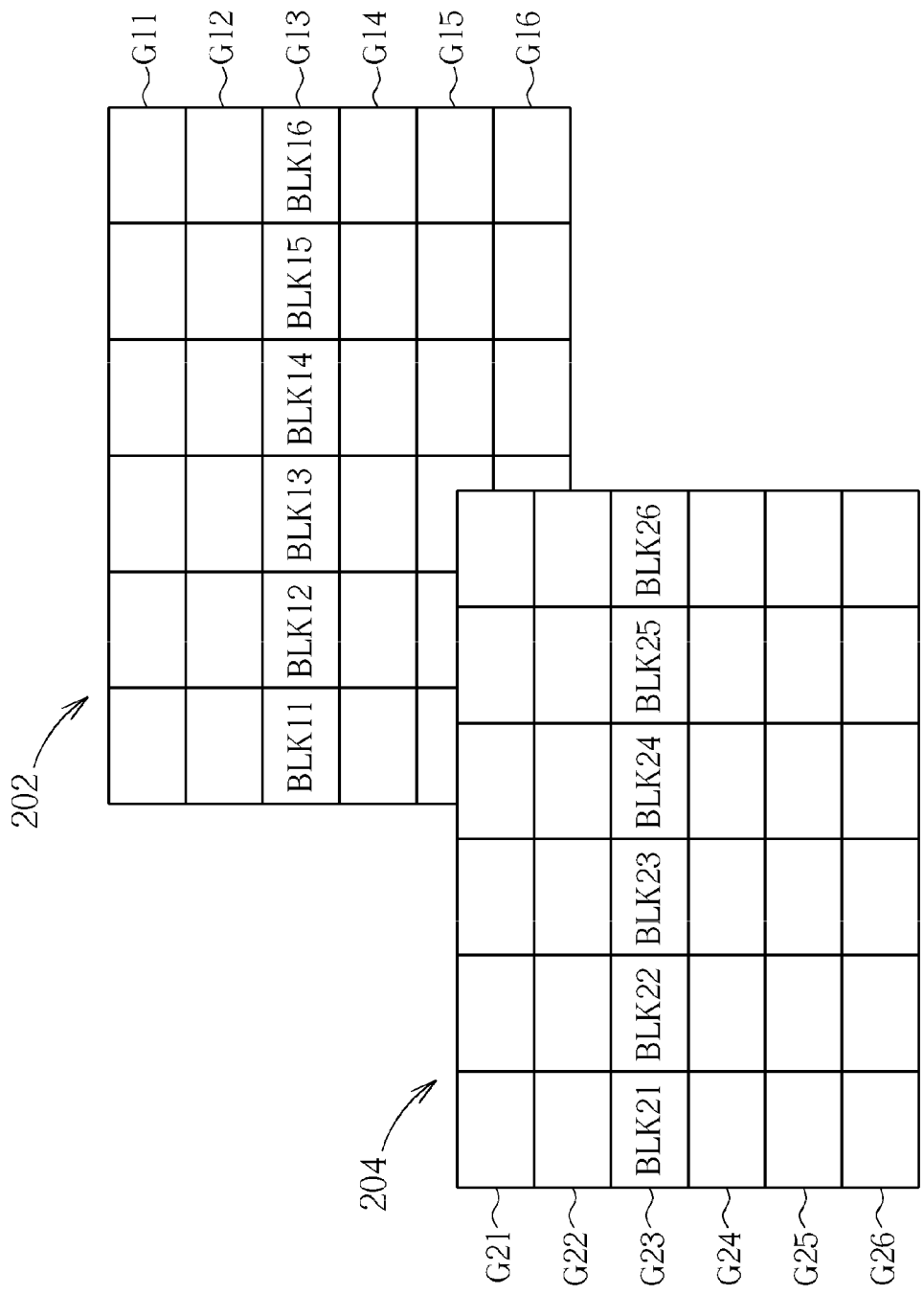
FIG. 2 is a diagram illustrating a first frame and a second frame which precedes the first frame.

FIG. 1 is a block diagram of an image data compression apparatus according to a first exemplary embodiment of the present invention. The exemplary image data compression apparatus 100 includes, but is not limited to, a compression circuit 102, a characteristic value extracting circuit 104, a selecting circuit 106, a threshold predicting circuit 108 including an accumulating unit 110 and a determining unit 112, and an output circuit 109. In this exemplary embodiment, the image data compression apparatus 100 is a block-based apparatus which processes blocks of each frame one by one. More specifically, one frame is divided into a plurality of blocks belonging to different horizontal line groups, where each of the horizontal line groups may include one or more horizontal lines according to the actual design consideration. In FIG. 2, a first frame 202 and a second frame 204 preceding the first frame 202 are shown. By way of example, but not limitation, the first frame 202 is a current frame with partial data currently processed by the compression circuit 102, and the second frame 204 is a previous frame with all data already processed by the compression circuit 102. As shown in the example of FIG. 2, each frame is divided into six horizontal line groups G11-G16/G21-G26 each having one or more horizontal lines. In addition, each of the horizontal line groups G11-G16 and G21-G26 contains six blocks each having the same block size. Taking the horizontal line group G13 of the first frame 202 for example, it contains blocks BLK11-BLK16. As the horizontal line group G23 of the second frame 204 and the horizontal line group G13 of the first frame 202 are located at the same position within a frame, the horizontal line group G23 of the second frame 204 contains blocks BLK21-BLK26 corresponding to BLK11-BLK16, respectively. It should be noted that the number of horizontal line groups per frame and the number of blocks per horizontal line group are for illustrative purposes only.

The compression circuit 102 is configured to sequentially process the blocks from left to the right in each horizontal line group, and sequentially process the horizontal line groups from top to the bottom in each frame. To put it another way, a block located at a top-left corner is the leading block in one frame that is processed by the compression circuit 102, and a block located at a bottom-right corner is the last block in the same frame that is processed by the compression circuit 102. Regarding each block, the image data compression apparatus 100 will employ the same processing methodology to handle the data compression of the block. For clarity and simplicity, compressing a first block is taken as an example to detail technical features of the present invention.

Assume that the compression circuit 102 is now processing a first block BLK11 included in the horizontal line group G13 of the first frame 202 shown in FIG. 2. The compression circuit 102 applies a plurality of compression approaches (e.g., different encoding schemes) to the incoming block DATA_IM (i.e., the first block BLK11), and generate a plurality of first candidate compression results of the first block accordingly. By way of example, but not limitation, the compression circuit 102 supports five compression approaches A1-A5, and generates five first candidate compression results C1-C5 for the first block BLK11 accordingly. The characteristic value extracting circuit 104 is coupled to the compression circuit 102, and derives a plurality of first characteristic values E1-E5 from the first candidate compression results C1-C5, respectively. The selecting circuit 106 is coupled to the compression circuit 102 and the characteristic value extracting circuit 104, and utilized for selecting a target compression result Code_out of the first block BLK11 from the first candidate compression results C1-C5 according to the first characteristic values E1-E5 and a characteristic value threshold E_TH. As the first block BLK11 is part of the first frame 202, the target compression result Code_out is part of the compressed image data of the first frame 202.

In this embodiment, the characteristic value extracting circuit 104 estimates differences (errors) between the first block BLK11 and a plurality of recovered blocks, respectively derived from the first candidate compression results C1-C5, to thereby generate the first characteristic values E1-E5 corresponding to the first candidate compression results C1-C5, respectively. For example, the characteristic value extracting circuit 104 decompresses (decodes) the first candidate compression results C1-C5 to generate respective recovered blocks, and then estimates an error resulted from each of the compression approaches A1-A5 by accumulating pixel value differences (pixel errors) between pixels of the first block BLK11 and pixels of each recovered block. In this way, the first characteristic values E1-E5 representative of errors caused by the compression approaches A1-A5 can be obtained.

As mentioned above, the selecting circuit 106 is to select one of the first candidate compression results C1-C5 as the target compression result Code_out of the first block BLK11. By way of example, but not limitation, the target compression result Code_out selected by the selecting circuit 106 is a first candidate compression result having a first characteristic value not less than the characteristic value threshold E_TH. In general, a compression approach providing a higher compression ratio will generate a compression result with a shorter code length and a larger error. As the first characteristic values E1-E5 are representative of errors caused by the employed compression approaches A1-A5, and the characteristic value threshold E_TH equivalently defines an expected average error, the target compression result Code_out selected by the selecting circuit 106 is therefore required to have a first characteristic value not less than the characteristic value threshold E_TH. To put it another way, the code length of the target compression result Code_out of the first block BLK11 will not exceed the expected average code length, which guarantees that the frame buffer can have available storage space for buffering the target compression result Code_out generated from one of the compression approaches A1-A5.

In a case where the display quality is also considered, the target compression result Code_out preferably has a longest code length among code lengths of first candidate compression results each having a first characteristic value not less than the characteristic value threshold E_TH. As the error caused by the employed compression approach is inversely proportional to the code length of the compression result generated by the employed compression approach, the selected target compression result Code_out can be regarded as a first candidate compression result which has a code length closest to an expected average code length but not longer than the expected average code length.

Moreover, it is possible that each of the first characteristic values is less than the characteristic value threshold E_TH. Therefore, in this exemplary embodiment, one of the first candidate compression results C1-C5 is defined to act as a default compression result, where the default compression result has a shortest code length among code lengths of the first candidate compression results C1-C5. In this way, the target compression result Code_out selected by the selecting circuit 106 will be the default compression result when first characteristic values of all first candidate compression results, except for the default compression result, are less than the characteristic value threshold E_TH.

Figure 3:
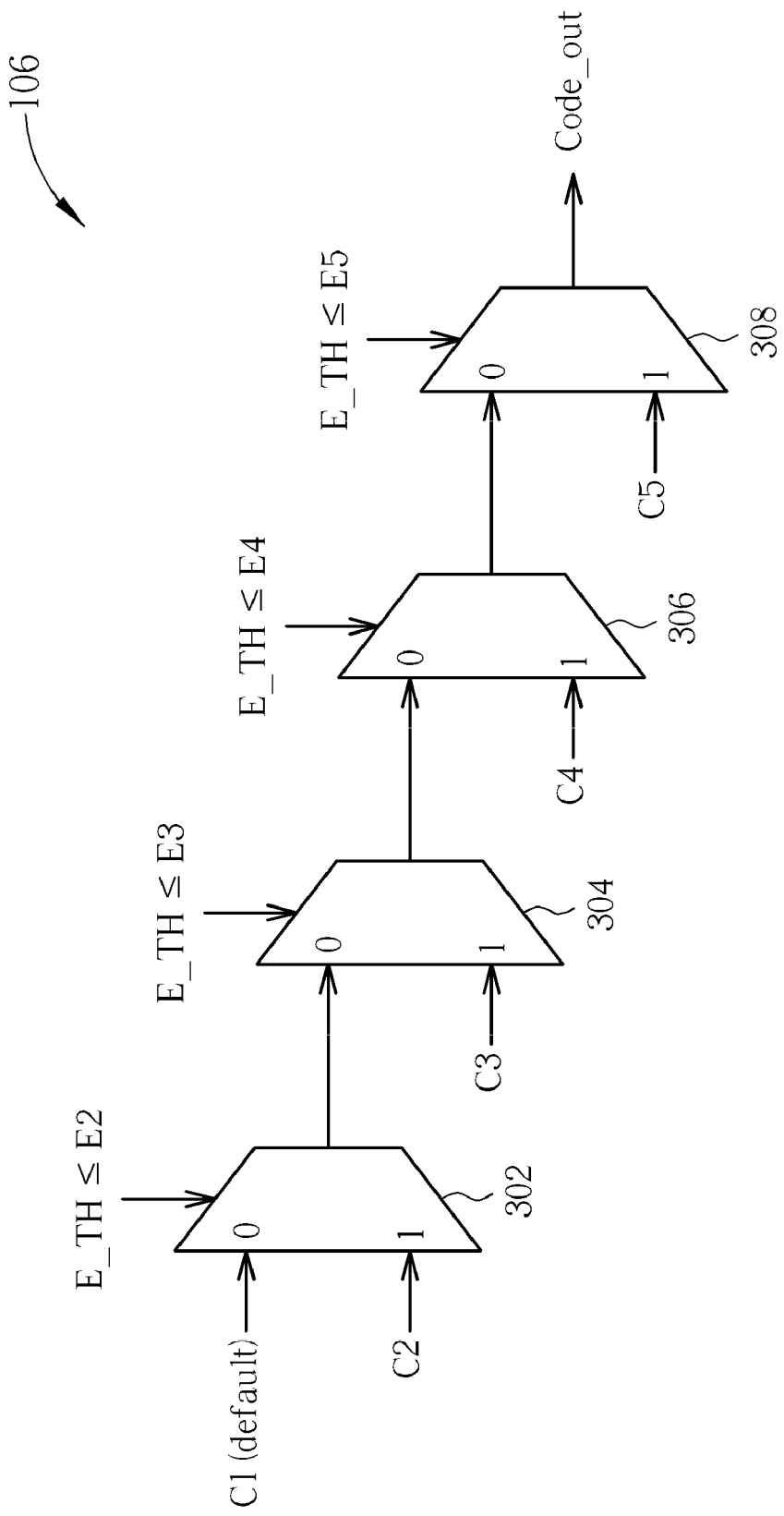
FIG. 3 is a diagram illustrating one exemplary implementation of a selecting circuit shown in FIG. 1.

FIG. 3 is a diagram illustrating one exemplary implementation of the selecting circuit 106 shown in FIG. 1. The selecting circuit 106 includes a plurality of multiplexers 302, 304, 306 and 308. Assume that the code lengths L1-L5 of the first candidate compression results C1-C5 generated from compression approaches A1-A5 applied to the same block (e.g., the first block BLK11) has the following relation: L1<L2<L3<L4<L5, implying E1>E2>E3>E4>E5 due to the fact that the error caused by the employed compression approach is inversely proportional to the code length of the compression result generated by the employed compression approach. Therefore, the output of the compression approach A1 will be defined as the default compression result. When the first characteristic values E2 is not less than the characteristic value threshold E_TH, the multiplexer 302 selects the first candidate compression result C2 with the code length L2 longer than the code length L1 of the default compression result (i.e., the first compression result C1) as its output to the following multiplexer 304; otherwise, the multiplexer 302 selects the default compression result (i.e., the first compression result C1) with the shortest code length L1 as its output to the following multiplexer 304. Similarly, the multiplexers 304, 306 and 308 determine outputs according to respective comparison results. That is, when a comparison result indicates that a first characteristic values is not less than the characteristic value threshold E_TH, a first candidate compression result with a longer code length is selected as a multiplexer output. As can be seen from the circuit structure shown in FIG. 3, the default compression result (i.e., the first compression result C1) will be the selected target compression result Code_out when each of first characteristic values E2-E5 is less than the characteristic value threshold E_TH.

The characteristic value threshold E_TH required by the selecting circuit 106 to select the target compression result Code_out of each block is determined by the threshold predicting circuit 108. In this exemplary embodiment, the characteristic value threshold E_TH is determined according to compression results of blocks previously processed by the compression circuit 102. More specifically, the compression circuit 102 further applies the compression approaches A1-A5 to each of a plurality of second blocks preceding the first block BLK11, and accordingly generates a plurality of second candidate compression results of each of the second blocks. For example, the second blocks may be blocks BLK21-BLK26 within the second frame 204 shown in FIG. 2. Regarding each of the blocks BLK21-BLK26, five second candidate compression results C1'-C5' are also generated by the compression circuit 102 according to compression approaches A1-A5, and the characteristic value extracting circuit 104 further derives a plurality of second characteristic values E1'-E5' from the second candidate compression results C1'-C5', respectively. The details of the threshold predicting circuit 108 are described as follows.

Figure 4:
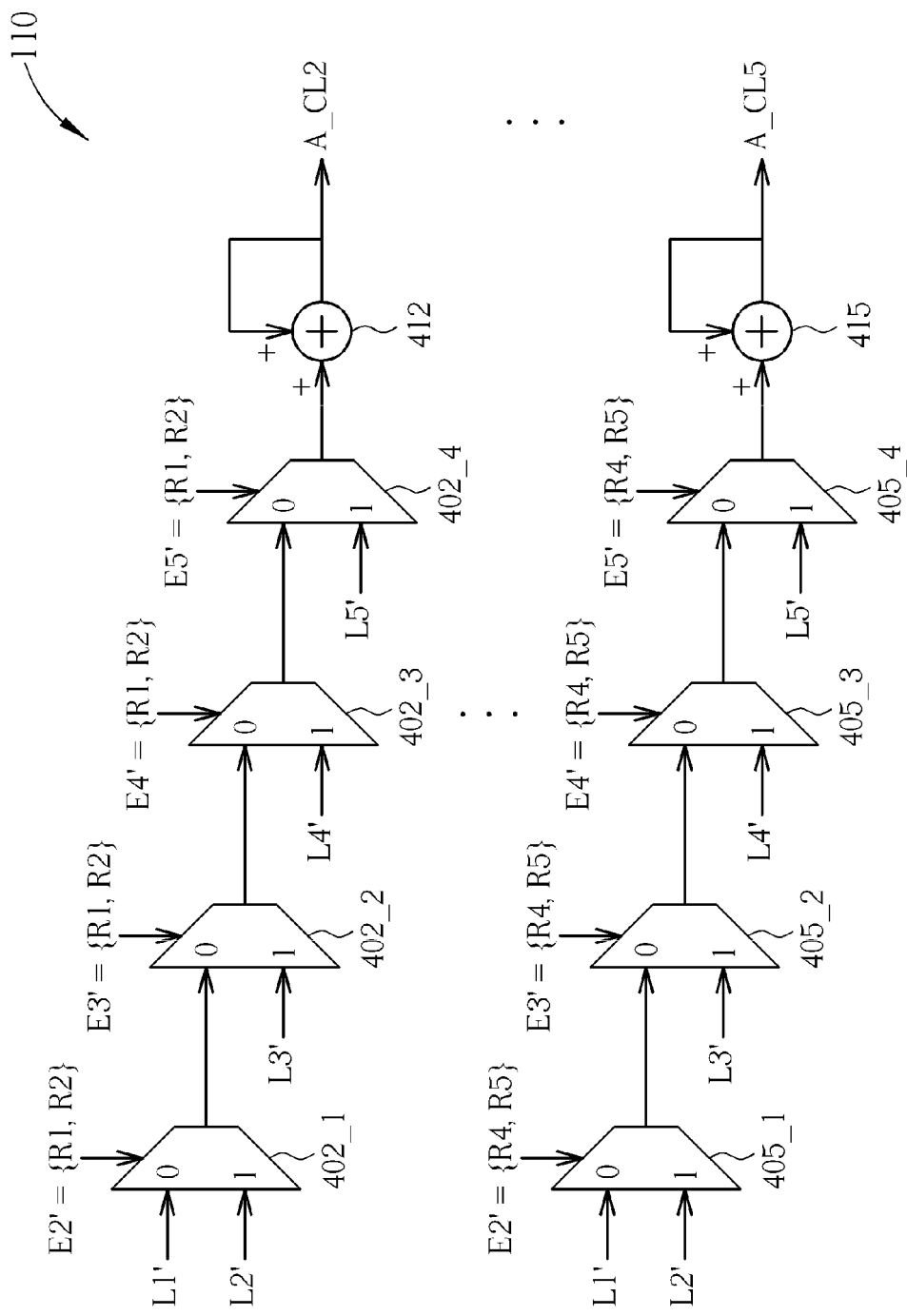
FIG. 4 is a diagram illustrating an exemplary implementation of an accumulating unit shown in FIG. 1.

As shown in FIG. 1, the threshold predicting circuit 108 includes the accumulating unit 110 and the determining unit 112. The operation of the accumulating unit 110 is based on a plurality of predetermined characteristic value ranges. More specifically, regarding each of the predetermined characteristic value ranges, the accumulating unit 110 accumulates code lengths of a plurality of compression results and accordingly generates an accumulated code length, where the compression results respectively correspond to the second blocks BLK21-BLK26, and each of the compression results is selected from the second candidate compression results C1'-C5' of each of the second blocks BLK21-BLK26. Please refer to FIG. 4, which shows an exemplary implementation of the accumulating unit 110 shown in FIG. 1. Assume that the code lengths L1'-L5' of the second candidate compression results C1'-C5' generated from compression approaches A1-A5 applied to the same block has the following relation: L1'<L2'<L3'<L4'<L5', which also implies E1'>E2'>E3'>E4'>E5'. In addition, the predetermined characteristic value ranges may be separated by a plurality of predetermined boundary values R1-R5 with the following relation: R1>R2>R3>R4>R5. The accumulating unit 110 obtains accumulated code lengths A_CL2, A_CL3, A_CL4 and A_CL5 for predetermined characteristic value ranges {R1, R2}, {R2, R3}, {R3, R4} and {R4, R5}, respectively, and includes a plurality of multiplexers (e.g., 402_1-402_4, . . . , 405_1-405_4) and a plurality of adders (412, . . . , 415). It should be noted that as each circuit for determining an accumulated code length has the same structure, only two circuits for determining the accumulated code lengths A_CL2 and A_CL5 are shown in FIG. 4 for clarity and simplicity.

The second characteristic values E2'-E5' corresponding to the second candidate compression results C2'-C5' of each of the blocks BLK21-BLK26 are processed by the accumulating unit 110 to update the accumulated code lengths A_CL2, . . . , A_CL5. Taking the second characteristic values E2'-E5' corresponding to the second candidate compression results C2'-C5' of the block BLK21 for example, each of the second characteristic values E2'-E5' is compared with predetermined characteristic value ranges {R1, R2}, . . . , {R4, R5}, respectively. As the second candidate compression results C1' has a shortest code length, the code length L1' of the second candidate compression results C1' is defined to act as a default code length. Therefore, when the second characteristic value E2' falls within the predetermined characteristic value range {R1, R2}, the multiplexer 402_1 selects the code length L2' of the second candidate compression result C2' as its output to the following multiplexer 402_2; otherwise, the multiplexer 402_1 outputs the default code length (i.e., the code length L1'). Similarly, the multiplexers 402_2, 402_3 and 402_4 determine outputs according to respective comparison results. That is, when a comparison result indicates that a second characteristic value falls within the predetermined characteristic value range {R1, R2}, a longer code length is selected as a multiplexer output. As can be seen from the circuit structure shown in FIG. 4, the default code length (i.e., the code length L1') will be outputted to the adder 412 to set the initial value of the accumulated code length A_CL2 when each of second characteristic values E2'-E5' does not fall within the predetermined characteristic value range {R1, R2}. Next, second characteristic values E2'-E5' corresponding to the second candidate compression results C2'-C5' of the following blocks BLK22-BLK26 will be processed by the accumulating unit 110 to update the accumulated code length A_CL2.

As a person skilled in the art can readily understand the generation of other accumulated code lengths A_CL3, . . . , A_CL5 after reading above paragraphs, further description is omitted here for brevity.

After the accumulated code lengths A_CL2, . . . , A_CL5 for the predetermined characteristic value ranges {R1, R2}, . . . , {R4, R5} are obtained by the accumulating unit 110, the determining unit 112 generates the characteristic value threshold E_TH to the output circuit 109 according to a length threshold L_TH and the accumulated code lengths A_CL2, . . . , A_CL5. By way of example, but not limitation, the characteristic value threshold E_TH is a lower bound of a predetermined characteristic value range selected by the determining unit 112 from the predetermined characteristic value ranges {R1, R2}, ..., {R4, R5}, and an accumulated code length corresponding to the selected predetermined characteristic value range is less than the length threshold L_TH. Besides, in a case where the display quality is also considered, the lower bound of the selected predetermined characteristic value range preferably has a smallest value among lower bounds of predetermined characteristic value ranges each with an accumulated code length less than the length threshold L_TH.

It should be noted that it is possible that each of the accumulated code lengths A_CL2, ..., ACL_5 is not less than the length threshold L_TH. Therefore, an upper bound with a greatest value among upper bounds of the predetermined characteristic value ranges {R1, R2}, ..., {R4, R5} acts as a default value, and the determining unit 112 sets the characteristic value E_TH by the default value when each of the accumulated code lengths A_CL2, ..., ACL_5 is not less than the length threshold L_TH.

Figure 5:
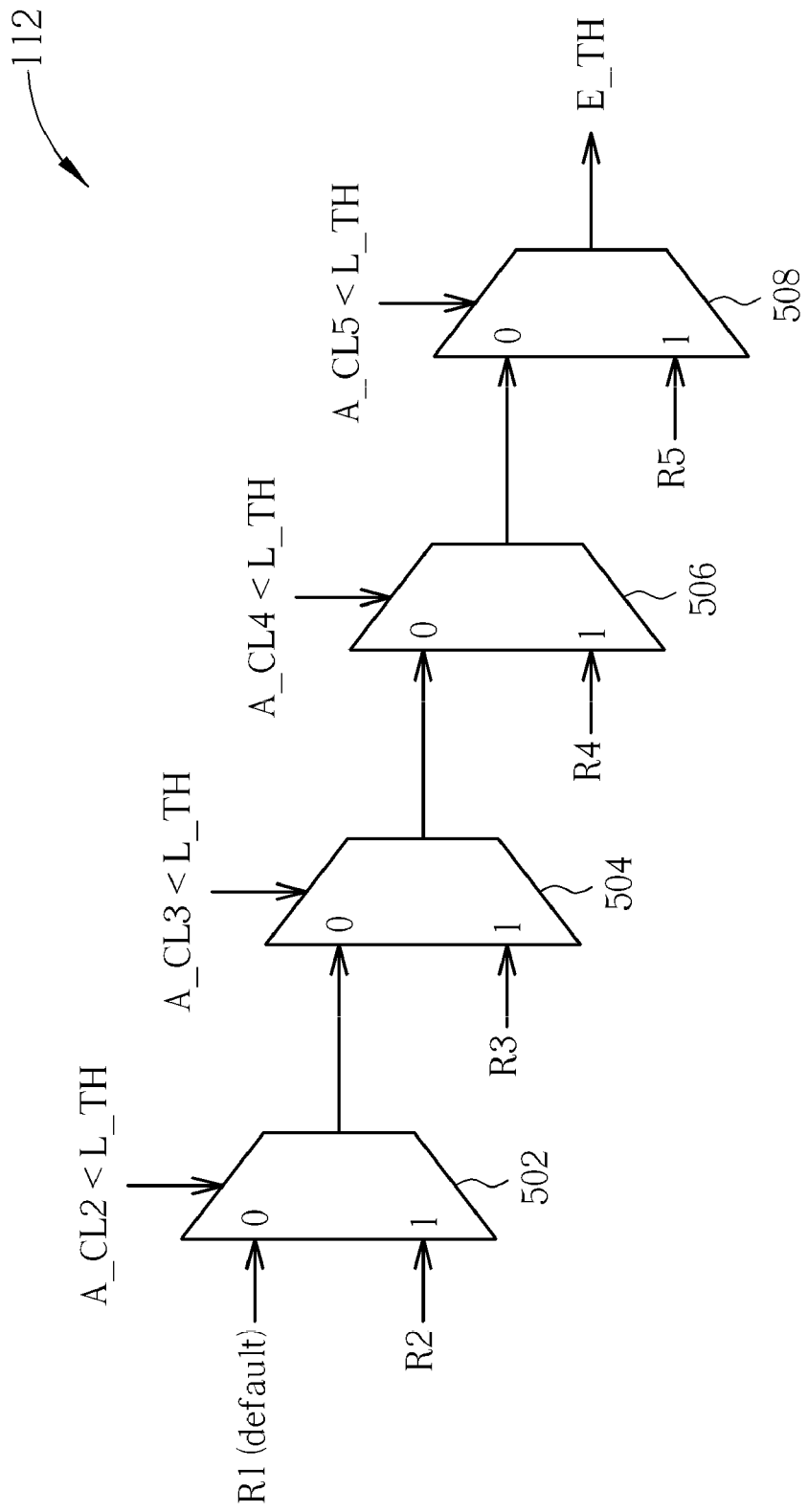
FIG. 5 is a diagram illustrating an exemplary implementation of a determining unit shown in FIG. 1.

FIG. 5 is a diagram illustrating an exemplary implementation of the determining unit 112 shown in FIG. 1. The determining unit 112 includes a plurality of multiplexers 502, 504, 506 and 508. As the predetermined boundary values R1-R5 has the following relation: R1>R2>R3>R4>R5, the upper bound of the predetermined characteristic value range {R1, R2} will be defined as the default value. When the accumulated code length A_CL2 is less than the length threshold L_TH, the multiplexer 502 selects the lower bound of the predetermined characteristic value range {R1, R2} as its output to the following multiplexer 504; otherwise, the multiplexer 502 selects the default value (i.e., R1) as its output to the following multiplexer 504. Similarly, the multiplexers 504, 506 and 508 determine outputs according to respective comparison results. That is, when a comparison result indicates that an accumulated code length is less than the length threshold L_TH, a lower bound of a predetermined characteristic value range is selected as a multiplexer output. As can be seen from the circuit structure shown in FIG. 5, the default value (i.e., R1) will be outputted as the characteristic value threshold E_TH when each of the accumulated code lengths A_CL2-A_CL5 is not less than the length threshold L_TH.

As mentioned above, the characteristic value threshold E_TH required by the selecting circuit 606 to select a target compression result of a current block is determined according to compression results of blocks previously processed by the compression circuit 102. Therefore, the output circuit 109 coupled between the threshold predicting circuit 108 and the selecting circuit 106 is implemented to buffer the characteristic value threshold E_TH generated from the threshold predicting circuit 108 before the compression circuit 102 applies the compression approaches to the first block (e.g., the first block BLK11 mentioned above), and provide the required characteristic value threshold E_TH to the selecting circuit 106 after the compression circuit 102 applies the compression approaches to the first block. For example, the output circuit 109 may be simply implemented by an input switch unit, an output switch unit, and a buffer unit with a plurality of storage spaces allocated to buffer a plurality of characteristic value thresholds, where the input switch unit stores one characteristic value threshold received from the determining unit 112 into a proper storage space in the buffer unit, and the output switch unit transmits a requested characteristic value threshold buffered in a storage space in the buffer unit to the selecting circuit 606. However, this is for illustrative purposes only. As long as the required characteristic value threshold can be successfully provided to the selecting circuit 106, any storage management mechanism can be employed by the output circuit 109 to control the storage of characteristic value thresholds generated from the threshold predicting circuit 108.

In above embodiment, the second blocks are blocks BLK21-BLK26 within the second frame 204 shown in FIG. 2. In an alternative design, the second blocks may be within the same first frame 202. Therefore, the second blocks are blocks of a horizontal line group which precedes a horizontal line group having the first block currently processed by the compression circuit 102. For example, blocks of the horizontal line group G12 in the first frame 202 are aforementioned second blocks.

Figure 6:
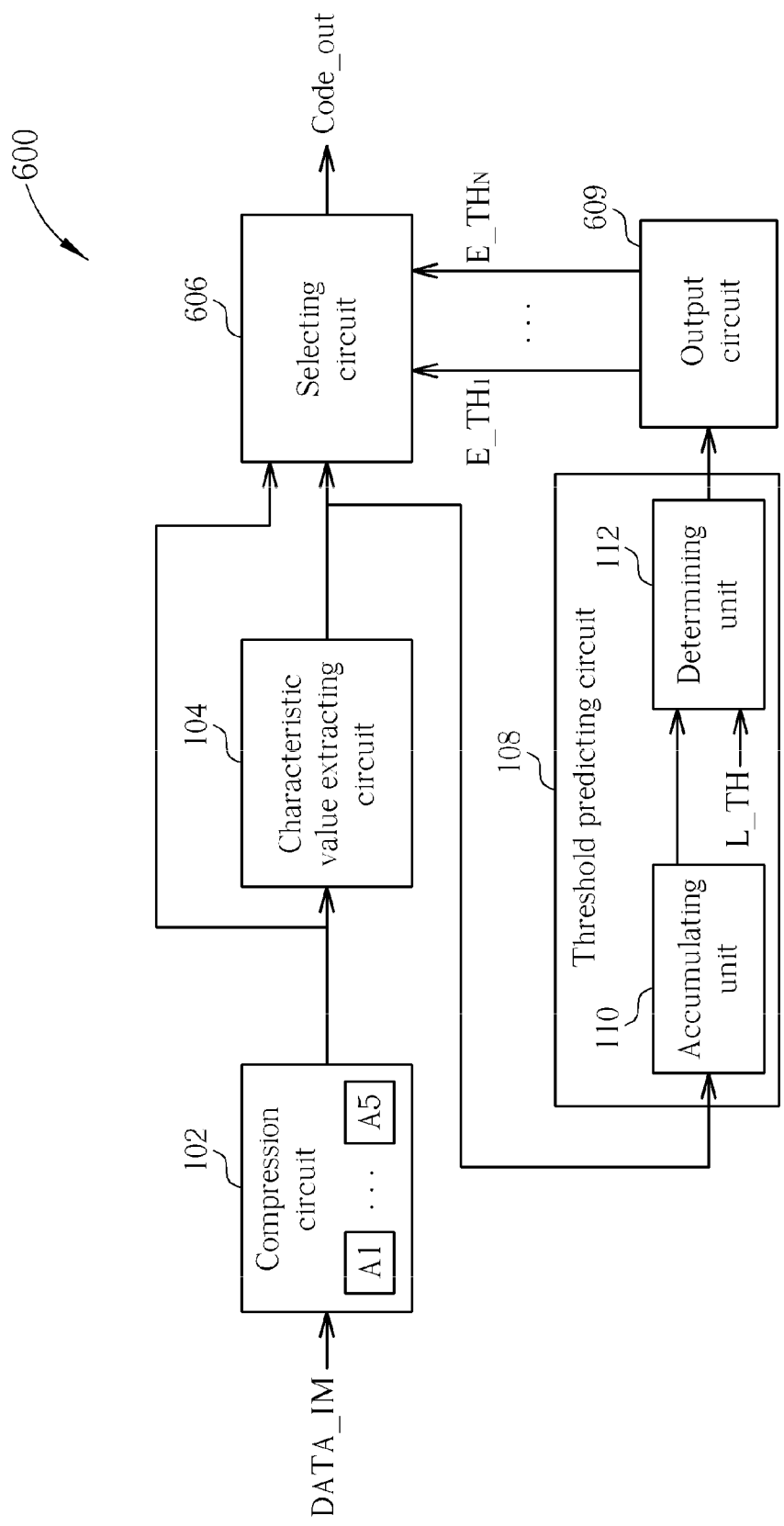
FIG. 6 is a block diagram of an image data compression apparatus according to a second exemplary embodiment of the present invention.

As shown in FIG. 1, the determining unit 112 outputs one characteristic value threshold E_TH to the selecting circuit 106, wherein the characteristic value threshold E_TH is generated according to compression results of blocks previously processed by the compression circuit 102. In an alternative design, the output circuit may output more than one characteristic value threshold to the selecting circuit. Thus, the selecting circuit selects a target compression result of a block from a plurality of candidate compression results of the block according to a plurality of characteristic value thresholds. FIG. 6 is a block diagram of an image data compression apparatus according to a second exemplary embodiment of the present invention. In addition to the afore-mentioned compression circuit 102, characteristic value extracting circuit 104, and threshold predicting circuit 108, the exemplary image data compression apparatus 600 includes a selecting circuit 606 and an output circuit 609. In this exemplary embodiment, the compression circuit 102 similarly applies different compression approaches A1-A5 to each of a plurality of second blocks preceding a first block, and accordingly generates a plurality of second candidate compression results of each of the second blocks. The threshold predicting circuit 108 sequentially generates a plurality of characteristic value thresholds $E\_TH_1$-$E\_TH_N$ which will be outputted by the output circuit 609 to the selecting circuit 606 when a target compression result of the first block is required to be selected from first candidate compression results generated by the compression circuit 102 applying the different compression approaches A1-A5 to the first block. Please note that the number of characteristic value thresholds $E\_TH_1$-$E\_TH_N$ is adjustable, depending upon actual design consideration.

In one exemplary implementation, the first block is within a first frame and the second blocks are within a plurality of second frames preceding the first frame. For example, the first block is the block BLK11 included in the horizontal line group G13 of the first frame 202 shown in FIG. 2. One of the characteristic value thresholds $E\_TH_1$-$E\_TH_N$ may be derived from candidate compression results of blocks BLK21-BLK26 included in the horizontal line group G23 of the second frame 204 shown in FIG. 2, and another one of the characteristic value thresholds $E\_TH_1$-$E\_TH_N$ may be derived from candidate compression results of blocks included in a specific horizontal line group of another second frame (not shown) preceding the first frame 202, where the position of the specific horizontal line group is identical to that of the horizontal line group G23 in the second frame 204.

In another exemplary implementation, the first block and the second blocks are within the same frame. For example, the first block is the block BLK11 included in the horizontal line group G13 of the first frame 202 shown in FIG. 2. One of the characteristic value thresholds $E\_TH_1$-$E\_TH_N$ may be derived from candidate compression results of blocks included in the horizontal line group G12 of the first frame 202, and another one of the characteristic value thresholds $E\_TH_1$-$E\_TH_N$ may be derived from candidate compression results of blocks included in the horizontal line group G11 of the first frame 202.

In yet another exemplary implementation, the first block is within a first frame, a portion of the second blocks is within the first block, and a remaining portion of the second blocks is within one or more second frames preceding the first frame. For example, the first block is the block BLK11 included in the horizontal line group G13 of the first frame 202 shown in FIG. 2. One of the characteristic value thresholds $E\_TH_1$-$E\_TH_N$ may be derived from candidate compression results of blocks BLK21-BLK26 included in the horizontal line group G13 of the second frame 204, and another one of the characteristic value thresholds $E\_TH_1$-$E\_TH_N$ may be derived from candidate compression results of blocks included in the horizontal line group G12 of the first frame 202.

After receiving the characteristic value thresholds $E\_TH_1$-$E\_TH_N$ buffered in the output circuit 609, the selecting circuit 606 selects the target compression result of the first block from the first candidate compression results according to the first characteristic values and characteristic value thresholds $E\_TH_1$-$E\_TH_N$. For example, assuming that the block BLK11 is the first block, the selecting circuit 606 selects a maximum value among the characteristic value thresholds $E\_TH_1$-$E\_TH_N$ and then follows the aforementioned selecting rule adopted by the selecting circuit 106 to use the maximum value for identifying the target compression result which has a first characteristic value not less than the maximum value. However, this is for illustrative purposes only, and is not meant to be a limitation to the scope of the present invention. Other means which select the target compression result based on the characteristic value thresholds $E\_TH_1$-$E\_TH_N$ still obey the spirit of the present invention.

In above exemplary embodiments, a line-based processing scheme is employed to derive each characteristic value threshold according to compression results of blocks corresponding to complete horizontal line(s). For example, compression results of all blocks BLK21-BLK26 included in the horizontal line group G23 are used to determine the characteristic value threshold E_TH, and the target compression result of each of the blocks BLK11-BLK16, respectively corresponding to the BLK21-BLK26, is selected by referring to the same characteristic value threshold E_TH. However, this is for illustrative purposes only, and is not meant to be a limitation to the scope of the present invention. For example, in an alternative design where the aforementioned length threshold L_TH is properly adjusted, compression results of blocks BLK21-BLK23 included in the horizontal line group G23 are used to determine a first characteristic value threshold, and the target compression result of each of the blocks BLK11-BLK13 is selected by referring to the same first characteristic value threshold; besides, compression results of blocks BLK24-BLK26 included in the horizontal line group G23 are used to determine a second characteristic value threshold, and the target compression result of each of the blocks BLK14-BLK16, respectively corresponding to the BLK24-BLK26, is selected by referring to the same second characteristic value threshold. This also obeys the spirit of the present invention.

Figure 7:
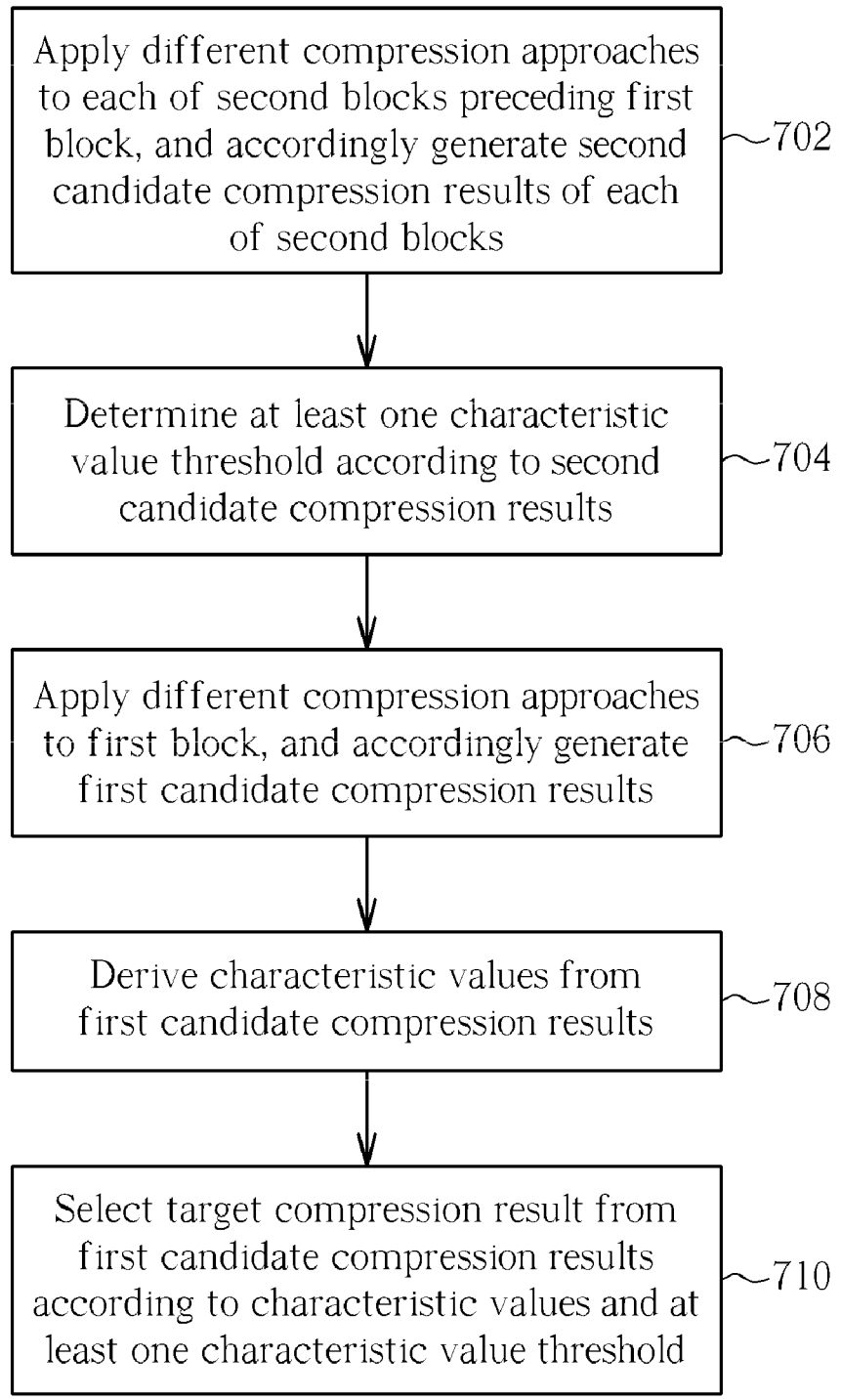
FIG. 7 is a flowchart illustrating a generalized image data compression method according to an exemplary embodiment of the present invention.

FIG. 7 is a flowchart illustrating a generalized image data compression method according to an exemplary embodiment of the present invention. The generalized image data compression method may be employed by the image data compression apparatuses 100 and 600. Provided that the result is substantially the same, the steps are not required to be executed in the exact order shown in FIG. 7. The exemplary generalized image data compression method includes following steps:

Step 702: Apply a plurality of compression approaches to each of a plurality of second blocks (e.g., previous blocks) preceding a first block (e.g., a current block), and accordingly generate a plurality of second candidate compression results of each of the second blocks. In one exemplary implementation, the first block is within a first frame, and the second blocks are within one or more second frames preceding the first frame. In another exemplary implementation, the first block and the second blocks are within a same frame. In yet another exemplary implementation, the first block is within a first frame, a portion of the second blocks is within the first frame, and a remaining portion of the second blocks is within one or more second frames preceding the first frame.

Step 704: Determine at least one characteristic value threshold according to the second candidate compression results.

Step 706: Apply the compression approaches to the first block, and accordingly generate a plurality of first candidate compression results of the first block.

Step 708: Derive a plurality of characteristic values from the first candidate compression results.

Step 710: Select a target compression result from the first candidate compression results according to the characteristic values and the at least one characteristic value threshold.

As a person skilled in the art can readily understand details of the steps shown in FIG. 7 after reading above paragraphs directed to the exemplary image data compression apparatuses 100 and 600, further description is omitted here for brevity.

The exemplary image data compression apparatus and method may be employed in an overdrive mechanism of an LCD panel for storing compressed image data of a previous frame, thereby reducing the buffer size of a frame buffer. However, applying the exemplary image data compression apparatus and method to other applications is also feasible.

Those skilled in the art will readily observe that numerous modifications and alterations of the device and method may be made while retaining the teachings of the invention.

What is claimed is:

1. An image data compression apparatus, comprising:
   a compression circuit, for applying a plurality of compression approaches to a first block, and accordingly generating a plurality of first candidate compression results of the first block;
   a characteristic value extracting circuit, coupled to the compression circuit, for deriving a plurality of first characteristic values from the first candidate compression results, respectively; and
   a selecting circuit, coupled to the compression circuit and the characteristic value extracting circuit, for selecting a target compression result of the first block from the first candidate compression results according to the first characteristic values and at least one characteristic value threshold,
   wherein the compression circuit further applies the compression approaches to each of a plurality of second blocks preceding the first block, and accordingly generates a plurality of second candidate compression results of each of the second blocks, and the image data compression apparatus further comprises:
   a threshold predicting circuit, for determining the at least one characteristic value threshold according to the second candidate compression results of each of the second blocks.

2. The image data compression apparatus of claim 1, wherein the characteristic value extracting circuit generates each of the first characteristic values by estimating a difference between the first block and one of a plurality of recovered blocks respectively derived from the first candidate compression results.

3. The image data compression apparatus of claim 1, wherein the selected target compression result is a first candidate compression result having a first characteristic value not less than the at least one characteristic value threshold.

4. The image data compression apparatus of claim 3, wherein the selected target compression result has a longest code length among code lengths of first candidate compression results each having a first characteristic value not less than the at least one characteristic value threshold.

5. The image data compression apparatus of claim 1, wherein one of the first candidate compression results acts as a default compression result which has a shortest code length among code lengths of the first candidate compression results; and the selected target compression result is the default compression result when all the first characteristic values, except for the default compression result, have first characteristic values less than the at least one characteristic value threshold.

6. The image data compression apparatus of claim 1, wherein the first block is within a first frame, and the second blocks are within one or more second frames preceding the first frame.

7. The image data compression apparatus of claim 1, wherein the first block and the second blocks are within a same frame.

8. The image data compression apparatus of claim 1, wherein the first block is within a first frame, a portion of the second blocks is within the first frame, and a remaining portion of the second blocks is within one or more second frames preceding the first frame.

9. The image data compression apparatus of claim 1, wherein the characteristic value extracting circuit further derives a plurality of second characteristic values from the second candidate compression results of each of the second blocks; and the threshold predicting circuit comprises:
an accumulating unit, wherein regarding each of a plurality of predetermined characteristic value ranges, the accumulating unit accumulates code lengths of a plurality of compression results and accordingly generates an accumulated code length, the compression results respectively correspond to the second blocks, and each of the compression results is selected from the second candidate compression results of each of the second blocks; and
a determining unit, coupled to the accumulating unit, for determining the at least one characteristic value threshold according to a length threshold and a plurality of accumulated code lengths respectively corresponding to the predetermined characteristic value ranges.

10. The image data compression apparatus of claim 9, wherein regarding each of the second blocks, the characteristic value extracting circuit generates each of the second characteristic values by estimating a difference between the second block and one of a plurality of recovered blocks respectively derived from the second candidate compression results.

11. The image data compression apparatus of claim 9, wherein the at least one characteristic value threshold is a lower bound of a predetermined characteristic value range selected by the determining unit from the predetermined characteristic value ranges, and an accumulated code length corresponding to the predetermined characteristic value range is less than the length threshold.

12. The image data compression apparatus of claim 11, wherein the lower bound of the predetermined characteristic value range has a smallest value among lower bounds of predetermined characteristic value ranges each with an accumulated code length less than the length threshold.

13. The image data compression apparatus of claim 9, wherein an upper bound with a greatest value among upper bounds of the predetermined characteristic value ranges acts as a default value; and the determining unit sets the at least one characteristic value threshold by the default value when each of the accumulated code lengths is not less than the length threshold.

14. An image data compression method, comprising:
applying a plurality of compression approaches to a first block, and accordingly generating a plurality of first candidate compression results of the first block;
deriving a plurality of first characteristic values from the first candidate compression results, respectively;
utilizing a selecting circuit to select a target compression result of the first block from the first candidate compression results according to the first characteristic values and at least one characteristic value threshold;
applying the compression approaches to each of a plurality of second blocks preceding the first block, and accordingly generating a plurality of second candidate compression results of each of the second blocks; and
determining the at least one characteristic value threshold according to the second candidate compression results of each of the second blocks.

15. The image data compression method of claim 14, wherein deriving the first characteristic values comprises:
generating each of the first characteristic values by estimating a difference between the first block and one of a plurality of recovered blocks respectively derived from the first candidate compression results.

16. The image data compression method of claim 14, wherein the selected target compression result is a first candidate compression result having a first characteristic value not less than the at least one characteristic value threshold.

17. The image data compression method of claim 16, wherein the selected target compression result has a longest code length among code lengths of first candidate compression results each having a first characteristic value not less than the at least one characteristic value threshold.

18. The image data compression method of claim 14, wherein one of the first candidate compression results acts as a default compression result which has a shortest code length among code lengths of the first candidate compression results; and the selected target compression result is the default compression result when all the first characteristic values, except for the default comparison result, have first characteristic values less than the at least one characteristic value threshold.

19. The image data compression method of claim 14, wherein the first block is within a first frame, and the second blocks are within one or more second frames preceding the first frame.

20. The image data compression method of claim 14, wherein the first block and the second blocks are within a same frame.

21. The image data compression method of claim 14, wherein the first block is within a first frame, a portion of the second blocks is within the first frame, and a remaining portion of the second blocks is within one or more second frames preceding the first frame.

22. The image data compression method of claim 14, wherein determining the at least one characteristic value threshold according to the second candidate compression results of each of the second blocks comprises:
   deriving a plurality of second characteristic values from the second candidate compression results of each of the second blocks;
   regarding each of a plurality of predetermined characteristic value ranges, accumulating code lengths of a plurality of compression results and accordingly generating an accumulated code length, where the compression results respectively correspond to the second blocks, and each of the compression results is selected from the second candidate compression results of each of the second blocks; and
   determining the at least one characteristic value threshold according to a length threshold and a plurality of accumulated code lengths respectively corresponding to the predetermined characteristic value ranges.

23. The image data compression method of claim 22, wherein deriving the second characteristic values from the second candidate compression results of each of the second blocks comprises:
   generating each of the second characteristic values by estimating a difference between the second block and one of a plurality of recovered blocks respectively derived from the second candidate compression results.

24. The image data compression method of claim 22, wherein the at least one characteristic value threshold is a lower bound of a predetermined characteristic value range selected from the predetermined characteristic value ranges, and an accumulated code length corresponding to the predetermined characteristic value range is less than the length threshold.

25. The image data compression method of claim 24, wherein the lower bound of the predetermined characteristic value range has a smallest value among lower bounds of predetermined characteristic value ranges each with an accumulated code length less than the length threshold.

26. The image data compression method of claim 22, wherein an upper bound with a greatest value among upper bounds of the predetermined characteristic value ranges acts as a default value; and the at least one characteristic value threshold is set by the default value when each of the accumulated code lengths is not less than the length threshold.

* * * * *